United States Patent
Inuzuka et al.

(10) Patent No.: US 6,554,873 B2
(45) Date of Patent: Apr. 29, 2003

(54) DYEING METHOD OF DYEING PLASTIC LENS, DYEING DEVICE AND DYEING JIG

(75) Inventors: Minoru Inuzuka, Aichi (JP); Masanori Uetani, Aichi (JP)

(73) Assignee: Nipek Co., Ltd., Gamagori (JP)

(*) Notice: Subject to any disclaimer, the term of this patent is extended or adjusted under 35 U.S.C. 154(b) by 14 days.

(21) Appl. No.: 09/770,498

(22) Filed: Jan. 29, 2001

(65) Prior Publication Data

US 2001/0016961 A1 Aug. 30, 2001

(30) Foreign Application Priority Data

Feb. 4, 2000 (JP) .................................. 2000-027743

(51) Int. Cl.[7] .................................................. D06P 5/00
(52) U.S. Cl. .................................................. 8/471; 8/506
(58) Field of Search ................. 8/471, 506; 427/162; 156/240

(56) References Cited

U.S. PATENT DOCUMENTS 3,800,738 A    4/1974   Tassara

FOREIGN PATENT DOCUMENTS

| EP | 0 982 432 A2 | 3/2000 | |
|----|---|---|---|
| FR | 2088376 | 7/1972 | |
| JP | 56-153321 | 11/1981 | |
| JP | 1-227814 | * | 8/1989 |
| JP | 1-229885 | * | 9/1989 |
| JP | 1-277814 | 11/1989 | |
| JP | 2-23314 | 1/1990 | |
| JP | 2000-9905 | 1/2000 | |
| JP | 2000-329901 | 11/2000 | |

* cited by examiner

Primary Examiner—Margaret Einsmann
(74) Attorney, Agent, or Firm—Oliff & Berridge, PLC

(57) ABSTRACT

A dyeing method of dyeing a plastic lens includes: a step of placing the lens in a predetermined position in a vacuum vapor-deposition device; a step of placing base bodies to be used for a dyeing operation in the vapor-deposition device, each of the base bodies being applied with dyeing solutions each containing a dissolved or fine-grained dispersed sublimatable dye to form a dye application area on each base body, and the base bodies being arranged in opposite positions to each other with respect to the lens so that the dye application area faces each surface of the lens without contact therewith; and a step of heating the base bodies by heat sources under vacuum in the vapor-deposition device, thereby sublimating the dye of the dye application areas to vapor-deposit the sublimated dye on the lens.

8 Claims, 5 Drawing Sheets

DYEING METHOD OF DYEING PLASTIC LENS, DYEING DEVICE AND DYEING JIG

BACKGROUND OF THE INVENTION

1. Field of the Invention

The present invention relates to a dyeing method of dyeing a plastic lens, a dyeing device, and a dyeing jig.

2. Description of Related Art

Conventionally, a dip dyeing method has been adopted in most cases as one of dyeing methods of dyeing plastic lenses for spectacles. This dip dyeing method includes: preparing a dyeing solution by mixing disperse dyes of primary colors of red, blue, and yellow and dispersing the mixture in water; heating the dyeing solution to about 90° C.; and dipping a plastic lens into the heated solution, thereby dyeing the lens.

As an alternative to the dip dyeing method, there has been proposed a vapor-deposition dyeing method. This method includes heating sublimatable solid dye under vacuum to sublimate and vapor-deposit the sublimated dye onto a plastic lens which is heated simultaneously under vacuum, thereby dyeing the lens.

The conventional dip dyeing method and vapor-deposition dyeing method, however, has the disadvantages that it is difficult to provide a stably dyed lens. In particular, it is difficult to dye a lens of low dyeability or to dye a lens in deep colors, or in colors of high density. Furthermore, it is desired to more easily and effectively dye a lens.

SUMMARY OF THE INVENTION

The present invention has been made in view of the above circumstances and has an object to overcome the above problems and to provide a dyeing method, a dyeing device, and a dyeing jig, capable of easily and effectively dyeing a plastic lens and also stably dyeing various lenses in various colors.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a dyeing method of dyeing a plastic lens, including: a step of placing the lens in a predetermined position in a vacuum vapor-deposition device; a step of placing base bodies to be used for a dyeing operation in the vapor-deposition device, each of the base bodies being applied with dyeing solutions each containing a dissolved or fine-grained dispersed sublimatable dye to form a dye application area on each base body, and the base bodies being arranged in opposite positions to each other with respect to the lens so that the dye application area faces each surface of the lens without contact therewith; and a step of heating the base bodies by heat sources under vacuum in the vapor-deposition device, thereby sublimating the dye of the dye application areas to vapor-deposit the sublimated dye on the lens.

According to another aspect of the present invention, there is provided a dyeing device for dyeing a plastic lens, including: a lens holding unit for placing the lens in a predetermined position in the device; a base body placing unit for placing base bodies to be used for a dyeing operation in opposite positions to each other with respect to the lens, each of the base bodies having a dye application area applied with dyeing solutions each containing a dissolved or fine-grained dispersed sublimatable dye, so that the dye application area faces each surface of the lens without contact therewith; a vacuum pump for creating an almost vacuum in the device; and a heating unit for heating the base bodies placed in the opposite positions to each other with respect to the lens.

According to another aspect of the present invention, there is provided a dyeing jig for dyeing a plastic lens, including a lens holder for holding a peripheral portion of the lens; and a base body retainer for placing base bodies to be used for a dyeing operation in opposite positions to each other with respect to the lens, each of the base bodies having a dye application area applied with dyeing solutions each containing a dissolved or fine-grained dispersed sublimatable dye, so that the dye application area faces each surface of the lens without contact therewith.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of a preferred embodiment of a dyeing method, a dyeing device, and a dyeing jig, embodying the present invention will now be given referring to the accompanying drawings.

Figure 1:
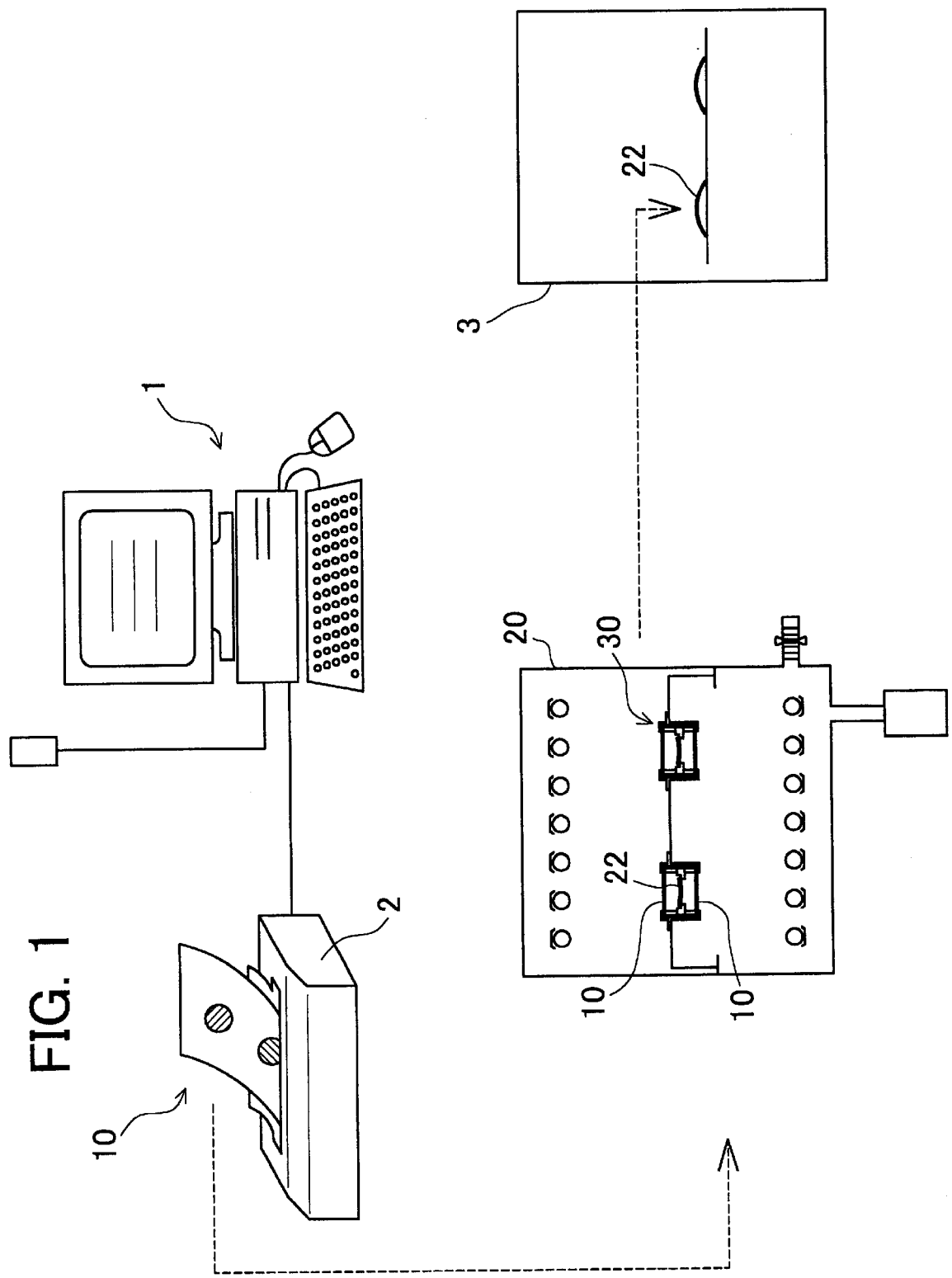
FIG. 1 is a schematic view of a system for dyeing a plastic lens in an embodiment according to the present invention.
Figure 5:
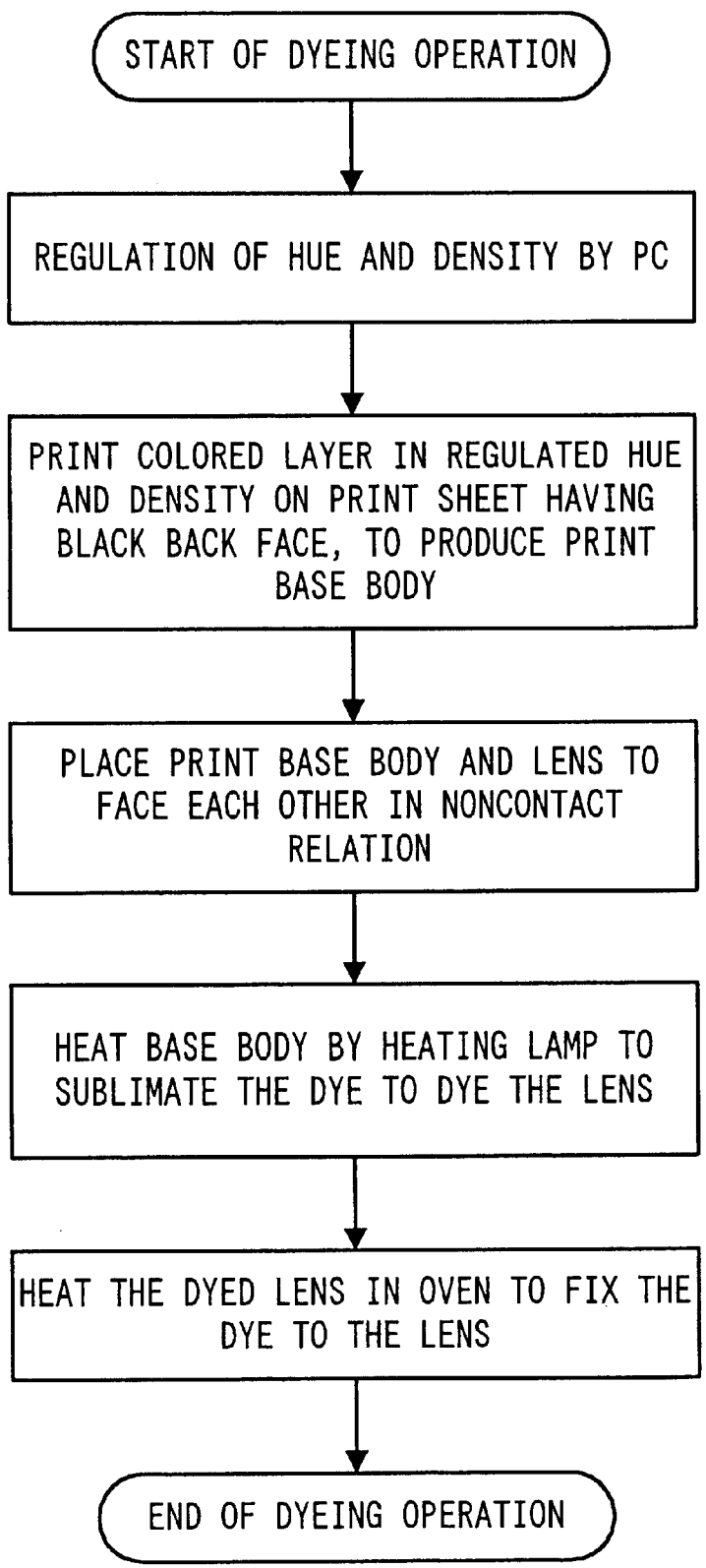
FIG. 5 is a flow chart showing a routine of the dyeing method in the embodiment.

FIG. 1 is a schematic diagram of a dyeing system for dyeing a plastic lens in the present embodiment. FIG. 5 is a flow chart showing a routine of the dyeing method.

(1) Production of a Print Base Body (a Base Body to be Used for a Dyeing Operation):

At first, a print base body 10 to be used for dyeing a plastic lens 22 (hereinafter, simply referred to as a lens) is produced. On the body 10, a sublimatable dye (a dyeing solution) is printed or applied.

As the sublimatable dye (which contains a dissolved or fine-grained dispersed sublimatable dye), there are used four dispersion dye inks of red, blue, yellow, and black, each being water-base ink, which are made by Upepo Kabushiki Kaisha. These inks are separately filled in commercially available ink cartridges for an ink jet printer. The cartridges are mounted in an ink jet printer 2. This printer 2 in the present embodiment is a commercially available printer (MJ-520C of EPSON Kabusiki Kaisha).

Prior to the use of such printer 2 to produce the base body 10 on which the dye of a desired color, an available personal computer (hereinafter, referred to as PC) 1 is used to regulate the hue and density to be printed. The regulation of the hue and others is handled by a drawing software, a CCM (computer color matching), or the like, on the PC 1. Accordingly, data on the desired color can be stored in the PC 1 so that the base body 10 with the same color quality can be repeatedly produced as needed. A color tint (ex. gradation pattern) is also controlled in digital form, which makes it possible to repeatedly reproduce the base body 10 in the same color density as required.

A print sheet 11 which forms the base body 10 is set in the printer 2. The PC 1 is then operated to carry out printing based on the preset data on the desired hue and density. On the front face of the print sheet 11 (the base body 10), circular colored layers 12 which are areas applied with the dye are printed as shown in FIG. 2B. In the present embodiment, two colored layers 12 are printed on one print sheet 11. This is because the previous formation of the colored layers in pairs is more convenient for dyeing a pair of spectacle lenses; right and left lenses. Furthermore, the diameter of the colored layer 12 is preferably determined to be larger than the diameter of the lens 22 to be dyed. If the diameter of the colored layer 12 is shorter than that of the lens 22 to be dyed, there is a possibility that the entire surface of the lens 22 facing the colored layer 12 could not be sufficiently dyed. For preventing such inconvenience, the diameter of the colored layer 12 is designed in the above manner.

Figure 2A:
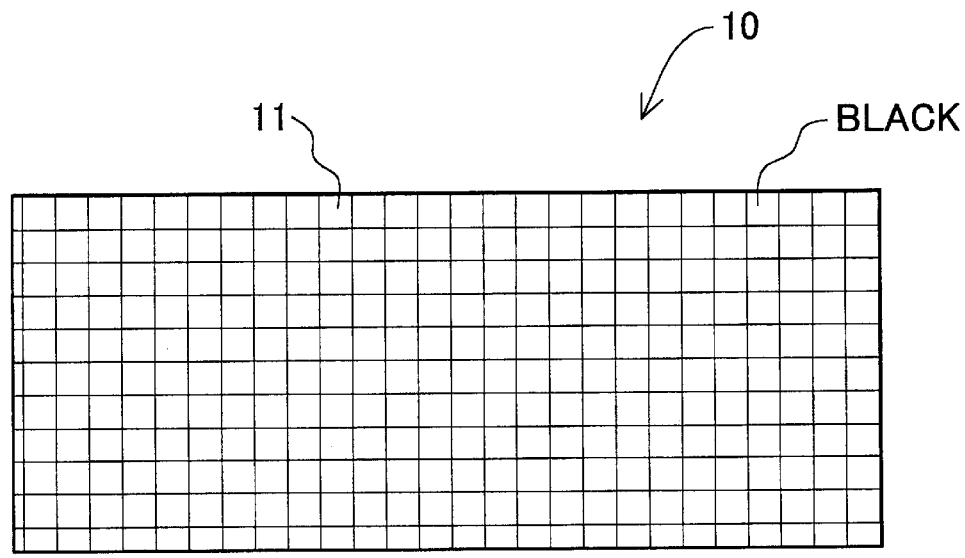
FIG. 2A is a back view of a print base body in the embodiment.
Figure 2B:
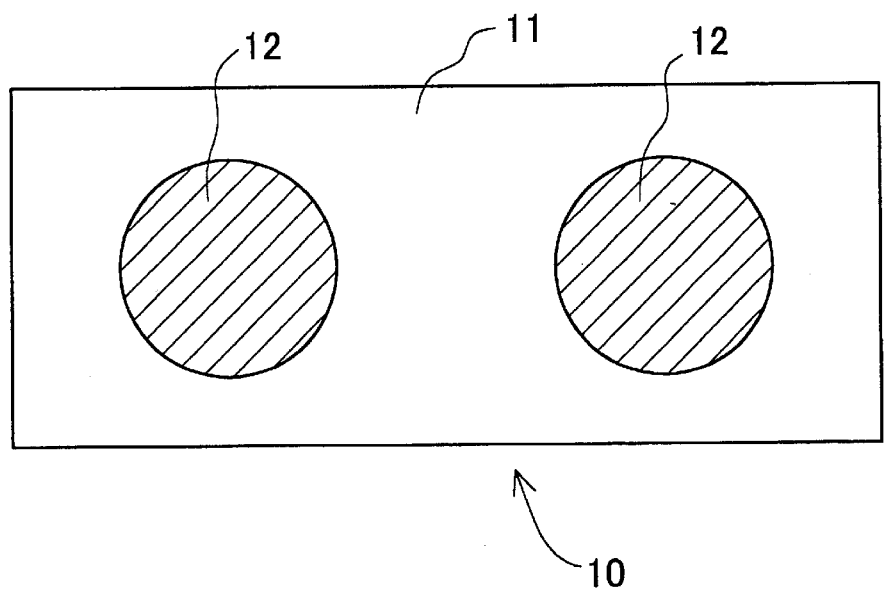
FIG. 2B is a front view of the print base body.

In the present embodiment, the print sheet 11 used for the production of the print base body 10 is a sheet having an entirely black-colored back face, on which no colored layer is printed, as shown in FIG. 2A. As such sheet 11 having a black-colored face, a commercially available one may be used, alternatively, a sheet of which both faces are white may be used if only one of the white faces is colored black. Using the sheet 11 having a black-colored face is to efficiently absorb heat generated by a heating source, whereby to help rapid sublimation of the dye printed on the sheet 11 in a dyeing operation of the lens 22.

In the present embodiment, the print sheet 11 having a black face is used to produce the print base body 10 for the above reason, but not limited thereto. For example, any print sheet may be used if only it has a back face that includes a predetermined region (a part or entire region) which is applied (painted or coated) with a color or material having a good or high coefficient of heat absorption (coefficient of infrared light absorption), for example, a color close to black or chrome. Furthermore, at least the predetermined region of such print sheet may be made of a material having a good or high heat conductivity, such as aluminum, so that more rapid sublimation of dyes can be effected. Alternatively, the print sheet itself may be made of an aluminum plate. In the use of paper for the sheet 11, any paper usable in the printer 2 may be used and, preferably, a thin paper which is good or high in heat conductivity is used. The front face of the print sheet 11, on which the colored layer 12 will be printed, may have the same color as that of the back face, but it is preferably white for facilitating visual observation of a print condition of the print base body 10 produced. The size of the print sheet 11 used for production of the base body 10 is not limited, and any sized-sheet usable in the printer 2 may be used. The sheet size used in the present embodiment is A5-size. This sheet is roughly cut out after output from the printer 2 to remove the needless margin so that the cut sheet is fit into a dyeing jig 30 mentioned later. In the present embodiment, the shape of the colored layer 12 is circular, but it is not limited thereto. Any size and shape may be adopted if only the dye can be diffused evenly over the area of the lens 22 desired to be dyed.

Figure 2C:
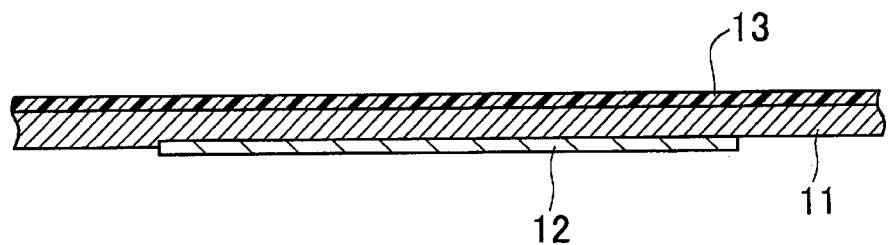
FIG. 2C is a sectional view of the print base body.

It is also preferable that the back face of the sheet 11 is entirely or partially applied with a coating for preventing sublimation of the dye from the back face. This allows sublimation of the dye from only the front face of the base body 10 when heated. FIG. 2C is a schematic enlarged sectional view of the base body 10. A coating layer 13 is therefore formed in advance on the back face of the print sheet 11 for preventing the passage of air therethrough. The material of the coating layer 13 may be selected from any materials which can prevent the passage of air and have enough heat-resistance not to melt at temperatures up to about 200° C., preferably about 270° C., and does not adsorb the sublimatable dye. For example, an olefinic resin, polyethylene glycol, or the like may be used. In this manner, the provision of the coating layer 13 makes it possible to prevent sublimation of the dye from the back face of the base body 10, efficiently dyeing the lens, thereby facilitating dyeing of the lens in colors of high density.

The above mentioned almost black-colored coating region for preventing sublimation may be formed on the back face of the sheet 11 by, for example, coating a mixture composed of carbon and polyethylene glycol or a mixture composed of an olefinic resin and a pigment on the back face.

Figure 3:
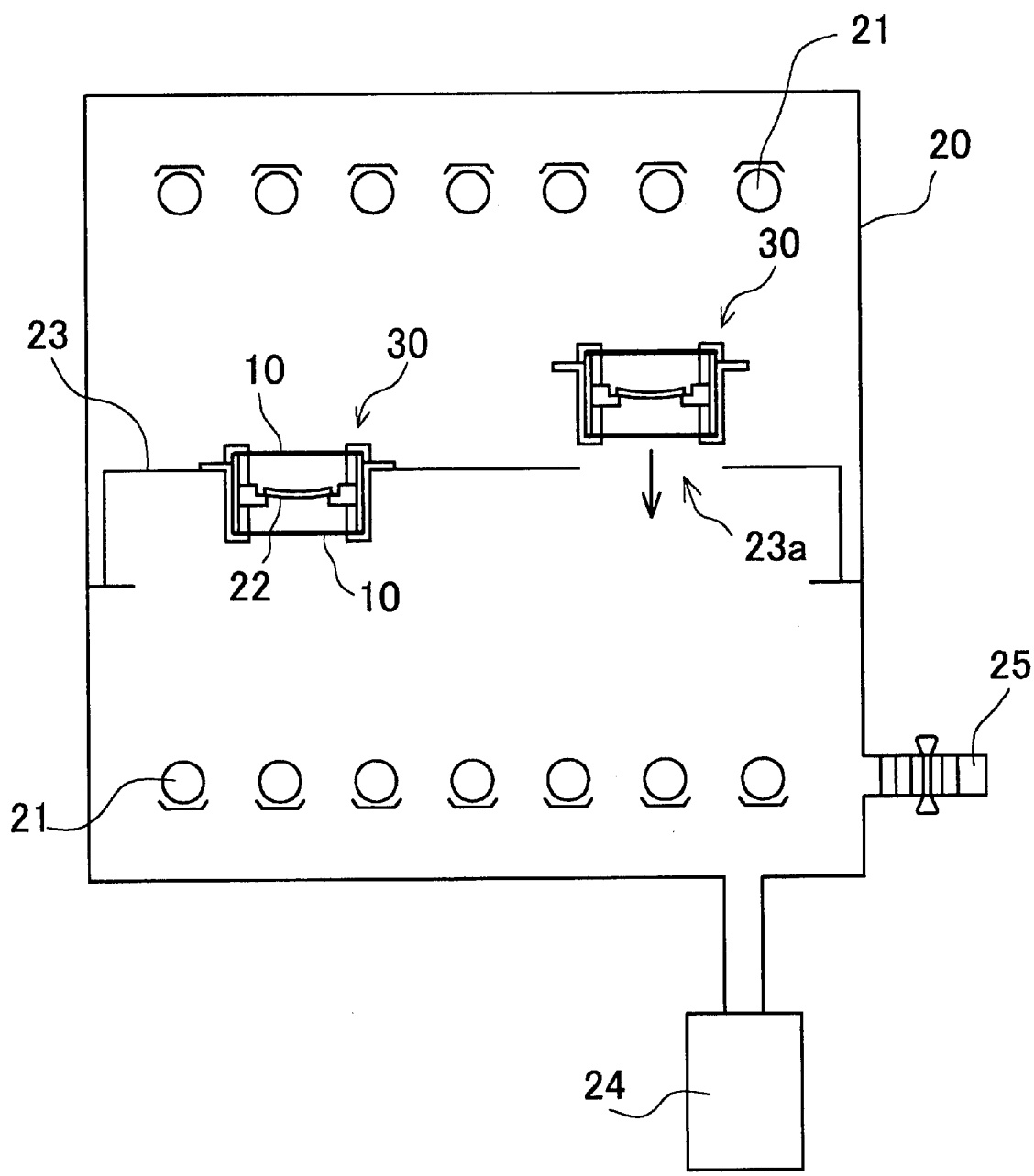
FIG. 3 is a schematic structural view of the inside of a vacuum vapor-deposition device used in the embodiment.

(2) Dyeing of a Plastic Lens:

FIG. 3 shows a schematic view of the inside of a vacuum vapor-deposition device (hereinafter, referred to as a vapor-deposition device) 20 as viewed from its front, which is used for dyeing the plastic lens 22 in the present embodiment.

The vapor-deposition device 20 is provided at its front with a door not shown which is opened/closed for insertion/removal of the plastic lens 22, the print base body 10, and others. In the device 20, fourteen heating lamps 21 in total used as heating sources to heat the base body 10 to thereby sublimate the dye are provided so that seven lamps are disposed at an upper position in the device 20 and seven lamps at a lower position. In this way, the lamps 21 are arranged in the positions opposite to the lens 22 with respect to the base bodies 10, respectively. The lamps 21 in the present embodiment are halogen lamps, but not limited thereto. Any lamps or the like capable of heating the base body 10 in noncontact relation therewith may be used.

In the vapor-deposition device 20, a shelf 23 is provided for holding thereon a dyeing jig 30 used to dye the plastic lens 22. The shelf 23 is formed with a plurality of rectangular holes 23*a* in each of which the dyeing jig 30 is fit. The dyeing jig 30 is thus held (placed) at a middle position in the device 20.

In the dyeing jig 30, the base bodies 10 are placed above and below the lens 22, or in opposite positions to each other with respect to the lens 22, so that the colored layers 12 face the concave and convex surfaces of the lens 22 respectively without contact therewith. When the base bodies 10 arranged as above are heated by the lamps 21 lit up, the concave and convex surfaces of the lens 22 can therefore be dyed at a time.

If the distance between the base body 10 and the lamps 21 is too small, a heating temperature with respect to the base body 10 may be different depending on portions of the base body 10, which causes nonuniform sublimation of the dye (the colored layer 12) provided on the base body 10, resulting in an unevenly dyed lens 22. If the distance is too large, on the other hand, producing only a low thermal effect, sublimation of the dye may take much time. Therefore, the distance between the base body 10 and the lamps 21 is preferably set in a range of about 50 mm to 500 mm, more preferably, about 150 mm to 300 mm.

Reference numeral 24 is a rotary pump which is used to produce an almost vacuum in the device 20. Reference numeral 25 is a leak valve which is opened to take air into the device 20 maintained under vacuum, thereby to return it to an atmospheric pressure.

Figure 4:
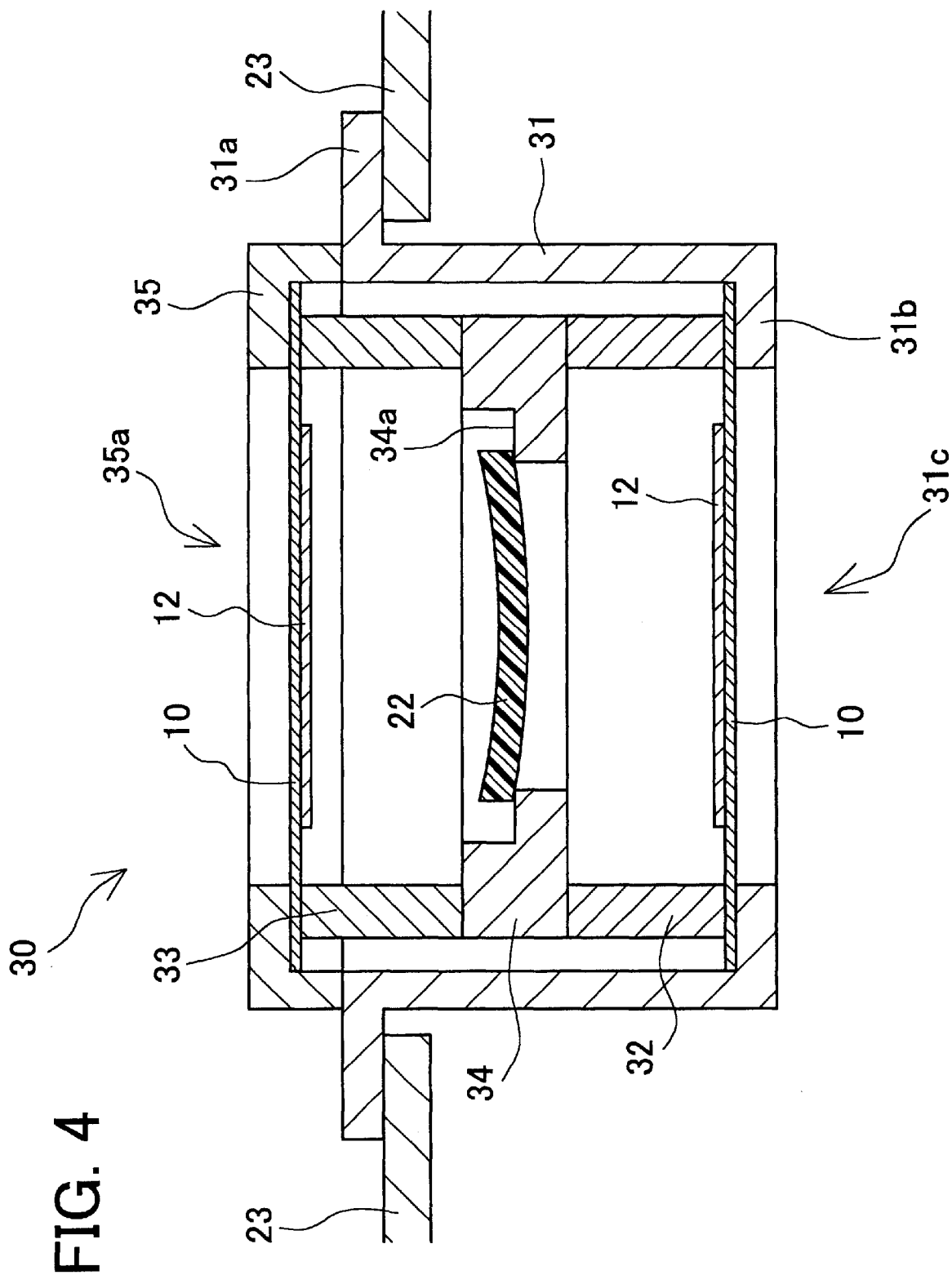
FIG. 4 is a partially enlarged sectional view of a dyeing jig disposed in the device shown in FIG. 3.

FIG. 4 is a sectional front view of the dyeing jig 30. Reference numeral 31 is a box-like container which is fittable in the hole 23a. This container 31 has the same shape as that of the hole 23a and is formed with a peripheral flange 31a which is allowed to hitch on the shelf 23 to prevent the container 31 from coming off the shelf 23. Therefore, the container 31 can be held in the shelf 23 with the flange 31a engaged therewith. The container 31 also has a bottom 31b formed with two circular openings 31c each having a sufficiently larger diameter than that of the colored layer 12 formed on the base body 10. When the base body 10 is put on the bottom 31b of the container 31, the colored layers 12 of the base body 10 are positioned in a one-to-one correspondence with the openings 31c. The two openings 31c are arranged in a line in a direction perpendicular to the drawing sheet, and only one of them is illustrated in FIG. 4.

With such configuration, when the lamps 21 disposed at the lower position in the vapor-deposition device 20 are allowed to emit light, or are lit up, the light will directly impinge on the back face of the lower base body 10 through the openings 31c, thereby easily causing sublimation of the dye from the colored layers 12.

In the container 31, space adjusting rings 32 are disposed on the base body 10 in a one-to-one relation with the two colored layers 12 formed on the body 10. Each of the rings 32 has a cylindrical shape and a diameter larger than that of the colored layer 12 to enclose it. This ring 32 is used to adjust the distance (space) between the lens 22 and the base body 10 placed on the bottom side in the container 31, while holding the base body 10 against dislocation. Changing the height of the ring 32, or replacing the ring 32 with another having a different height, enables adjustment of the distance between the lens 22 and the base body 10. This makes it possible to control the color density of the lens 22 to be dyed.

As shown in FIG. 4, a lens holder 34 for holding the lens 22 is put on the ring 32. A space adjusting ring 33 is further placed on the lens holder 34 to adjust the distance (space) between the lens 22 and the base body 10 placed on the upper side in the container 31. The lens holder 34 has a cylindrical shape provided with an internal shoulder 34a for supporting the lens 22 as shown in FIG. 4. With this shoulder 34a, the lens 22 can be set in the holder 34 without falling down.

The lens holder 34 is put on the ring 32, and the lens 22 is set in the holder 34 so that the peripheral portion of the lens 22 is positioned on the shoulder 34a. Thus, the lens 22 can be held in place above the opening 31c.

Reference number 35 is a retainer for holding the base body 10 with respect to the ring 33. This retainer 35 is formed at its upper face with two openings 35a as with the bottom 31b of the container 31 (only one of the openings is shown in FIG. 4). Through the openings 35a, the light emitted from the lamps 21 (when lit up) disposed at the upper position in the vapor-deposition device 20 to directly impinge on the back face of the upper base body 10.

Each height of the rings 32 and 33 may be determined depending on a desired dyeing condition. However, if the base body 10 makes contact with the lens 22, the contact portion of the lens 22 will be dyed in a different color density and hue from the noncontact portion, thus irregularly coloring the lens 22. To the contrary, if the base body 10 is too apart from the surface of the lens 22 to be dyed, the lens 22 can not be dyed in high density. Furthermore, particles of the dye tend to gather together without uniformly dispersing in a vapor phase and therefore unevenly deposit on the dyeing surface of the lens 22. In view of this, the distance from the base body 10 to the geometrical center of the dyeing surface of the lens 22 is preferably set in a range of about 1 mm to 30 mm for the convex surface side and about 1 mm to 30 mm for the concave surface side.

The material of the lens 22 to be dyed is selected from a polycarbonate resin (e.g., diethylene glycol bisallyl carbonate polymer (CR-39)), a polyurethane resin, an allyl resin (e.g., allyl diglycol carbonate and its copolymer, and diallyl phthalate and its copolymer), a fumaric acid resin (e.g., benzyl fumarate copolymer), a styrene resin, a polymethyl acrylate resin, a fiber resin (e.g., cellulose propionate). Furthermore, a material with a high refractive index such as a thiourethane type, a thioepoxy type, and the like, and other materials with a high refractive index which have conventionally been regarded as having low (poor) dyeability may be used.

With the vapor-deposition device 20 having the above construction, the following operations take place to dye the lens 22.

The unillustrated door of the device 20 is opened, and the container 31 is set in the holes 23a of the shelf 23. Sequentially, the base bodies 10 produced in the above process (1) and the lens 22 are set in the dyeing jig 30 as shown in FIG. 4.

Then, the door of the device 20 is airtightly closed. The pump 24 is then driven to produce a vacuum in the device 20. This vacuum is produced by reducing the pressure in the device 20 to about 0.1 to 5 kPa. The vacuum may be below 0.1 kPa, but it will require a high-powered exhauster. On the other hand, the higher the pressure in the device 20, the higher the temperature is required for sublimation of the dye. Therefore, the upper limit of the pressure is preferably up to about 5 kPa, more preferably in a range of about 1 to 3 kPa.

When the pressure in the device 20 is reduced to a predetermined value, the lamps 21 disposed at the upper and lower positions in the device 20 are lit up. The dye of the colored layer 12 can not be sublimated at temperatures of 100° C. or below. It is therefore preferable to increase the heating temperature to as high as possible in the shortest time. The reason why the heating temperature is thus increased to as high as possible is to enhance the productivity by shortening the time needed for completing the sublimation. The reason why the heating time is minimized is to prevent the occurrence of a defective condition that, if the time needed for increasing the heating temperature is too long, the temperature of the lens 22 itself will rise, making it difficult to stick the sublimated dye to the lens.

In the present embodiment, the base body 10 (print sheet 11) has a black-colored back face as mentioned above, so that the base body 10 can absorb heat rapidly, increasing the rate of temperature thereof and easily raising the temperature to high. Therefore, the sublimation of the dye from the base body 10 can be completed in a short time, and the production efficiency can be enhanced. The completion of sublimation in a short time can also suppress the rise in temperature of the lens 22 itself.

The lamps 21 disposed at the upper position in the vapor-deposition device 20 are lit up to heat the base body 10 placed in the dyeing jig 30 at the upper portion thereof. On the other hand, the lamps 21 disposed at the lower position in the device 20 are lit up to heat the base body 10 placed in the jig 30 at the lower (bottom) portion thereof. Thus, both surfaces of the lens 22 are dyed at the same time. The higher density can therefore be obtained in one process as compared with the density obtained by a dyeing operation on only a single surface.

Furthermore, the concave surface and the convex surface of the lens 22 are dyed by use of individual print base bodies 10, so that the lens 22 may be dyed with different colors and materials between the concave surface and the convex surface.

After completion of the heating by the lamps 21, the leak valve 25 is opened to return the pressure in the device 20 to normal atmospheric pressure. Then, the door of the device 20 is opened and the lens 22 is taken out. On this lens 22, the sublimated dye has been vapor-deposited, but it is liable to come off in this state. Therefore, the lens 22 is heated in an oven 3 (see FIG. 1) under normal atmospheric pressure to fix the deposited dye onto the lens 22. This fixation process is carried out in the following steps; raising the temperature in the oven 3 to a temperature as high as possible below a resistible temperature of the lens 22; heating the lens 22 for a predetermined time needed for producing a desired hue and density; and after a lapse of the predetermined time, taking the lens 22 out of the oven 3. If the heating temperature in the oven 3 is below 90° C., the color can not sufficiently develop. If it exceeds 150° C., the lens may be easily deformed. Therefore, the heating temperature is preferably set in a range of about 90° C. to 150° C. and, more preferably, about 110° C. to 130° C. The heating temperature may be increased up to about 170° C. according to the type of lens. If the heating time is shorter than 30 minutes, the color can not sufficiently develop. If it exceeds 3 hours, the dye may change in quality, which makes it impossible to provide a desired hue. For preventing those inconveniences, the heating time is preferably set in a range of 30 minutes to 3 hours and, more preferably, 30 minutes to 2 hours.

Furthermore, the heating temperature in the oven 3 may be changed so as to decrease continuously or in multiple steps. Alternatively, a constant heating temperature and a changing heating temperature may be combined. For instance, the lens is heated at a temperature of 140° C. for 1.5 hours (or at 150° C. for 1 hour); the temperature is gradually reduced from 140° C. (or 150° C.) to 80° C. in 2 hours; the lens is heated at 80° C. for 1 hour; the temperature is gradually reduced from 80° C. to 40° C. in 2 hours; and the heating is completed at the time when the temperature becomes 40° C. (in this case, the heating time may exceed 3 hours). It is to be noted that a preferable changing range of the heating temperature is from about 30° C. to 170° C. and a preferable heating time is up to about 7 hours. Under these conditions, the color can sufficiently develop and the deformation of the lens can be suppressed.

As mentioned above, by dyeing the lens from both sides thereof at one time, the lens can be dyed in color of high density in a short time. As compared with the conventional dip dyeing method, the dyeing method performed in the vapor-deposition according to the present invention can sufficiently dye even lenses made of materials with a high refractive index and low dyeability.

Moreover, a predetermined pretreatment for helping or enhancing the fixation of the dye may be applied to the lens 22 itself before the dye is sublimated from the base body 10 to be vapor-deposited onto the lens. This pretreatment can shorten the fixation time in the oven 3. In the pretreatment, a dyeing auxiliary agent called a carrier, such as a phenyl phenol type, a naphthalene type, a chlorobenzene type, or the like, is used. An example of the pretreatment before dyeing of the lens 22 is performed by dipping the lens 22 itself in a carrier solution which is prepared by dissolving a dyeing auxiliary agent (DK-C of Daiwa Kagaku Kogyo Kabushiki Kaisha) in water and then washing the lens 22 by a washer. In this case, the carrier solution preferably contains the dyeing auxiliary agent at the ratio of about 0.1% to 5% to the total amount of the solution; the water temperature is preferably in a range of 60° C. to 100° C., more preferably, 80° C. to 90° C.; and the dipping time is preferably in a range of 1 to 3 minutes.

EXAMPLE 1

In this example 1, a lens of CR-39 is used. As a sublimatable ink, a disperse dye (water-base) made by Upepo Kabushiki Kaisha is used. By using a drawing software in the PC 1, the hue (U) is set to 160, the saturation (S) is set to 255, and the lightness (V) is set to 153. Based on this color data, two circular layers 12 each having a diameter of 90 mm are printed on a print sheet 11 having a white front face (printing face) and a black back face (on which a coating treatment for preventing the passage of air has been applied). Sequentially, the sheet 11 is cut to remove the needless margin so as to fit into the dyeing jig 30 shown in FIG. 4. The base body 10 is produced in the above manner. In this example, two base bodies 10 are produced for one dyeing jig 30.

Next, the jig 30 is mounted on the shelf 23 in the vapor-deposition device 20 (see FIG. 3). The lens 22 and the two base bodies 10 are placed in the jig 30. The pump 24 is driven to reduce the pressure in the device 20 to 1 kPa. When the pressure becomes 1 kPa, the upper and lower lamps (halogen lamps in this example) 21 are lit up to sublimate the dye from the base bodies 10. The distance between the lamps 21 and each base body 10 is set to 200 mm.

A temperature rising state of the base body 10 during the heating is shown in Table 1. Temperature changes are measured by a thermocouple which is brought into contact with the back face (black side) of the base body 10.

As a result, the dye (the colored layer 12) on the base body 10 was completely sublimated in about 45 seconds from light-up of the lamps 21.

TABLE 1

| Light-up duration (sec.) | 0 | 10 | 20 | 30 | 40 | 50 | 60 | 70 | 80 | 90 | 100 | 110 | 120 |
|---|---|---|---|---|---|---|---|---|---|---|---|---|---|
| Temp. of base body (° C.) | 15 | 54 | 95 | 128 | 162 | 186 | 206 | 226 | 240 | 253 | 264 | 274 | 282 |

Comparison 1

This comparison 1 uses the same conditions as those in the example 1, except that a print sheet 11 having both white faces is used to produce a base body 10. A temperature rising state of the base body 10 in this comparison is shown in Table 2.

The result is that the dye (the colored layer 12) on the base body 10 was merely partially sublimated even after a lapse of about 45 seconds from light-up of the lamps 21. Complete sublimation of the dye took 120 seconds or more from the light-up of the lamps 21.

TABLE 2

| Light-up duration (sec.) | 0 | 10 | 20 | 30 | 40 | 50 | 60 | 70 | 80 | 90 | 100 | 110 | 120 |
|---|---|---|---|---|---|---|---|---|---|---|---|---|---|
| Temp. of base body (° C.) | 15 | 34 | 51 | 69 | 88 | 101 | 113 | 124 | 134 | 143 | 145 | 147 | 151 |

EXAMPLE 2

Under the same conditions as in the example 1, the dyeing operation is performed on the convex and concave surfaces of the lens 22 (double-sided dyeing). With the lamps 21 lit up, the base body 10 is continuously heated until its temperature is raised to 250° C. After the completion of heating, the dyed lens 22 is taken out and then heated in the oven 3 at a temperature of 125° C. for about 60 min. to fix the color of the lens 22. The chromaticity data is shown in Table 3. The color measurement is made using a spectroscopic photometer (DOT-3 made by Kabushiki Kaisha Murakami Sikisai Gijutsu Kenkyusho (Murakami color technical institute) using a D65 light source and 10 visual field.

In Table 3, Y indicates visual sensitivity transmittance; and L*, a*, and b* indicate CIE (Commission International d'Eclairage) color specification values.

In the result of the visual observation that was made after the fixation process to check whether the produced color was in agreement with the desired color without appearance failure, color unevenness, and color missing portions, no particular deficiencies were found.

TABLE 3

|  | Y | L* | a* | b* |
|---|---|---|---|---|
| Double-sided dyeing | 21.57 | 53.57 | −10.73 | 42.64 |

As seen in Table 3, by dyeing the both surfaces of the lens 22 at a time, the lens 22 could be dyed in the color density of approximately 80% in one dyeing work.

Comparison 2

Under the same conditions as in the example 1, the dyeing operation is carried out on only the concave surface of the lens 22 (single-side dyeing). Only the lamps 21 disposed at the upper position are lit up to continuously heat the base body 10 until its temperature rises to 250° C. After the completion of heating, the lens dyed is taken out and then heated in the oven 3 at a temperature of 125° C. for about 60 min. to fix the color of the lens 22. The chromaticity data is shown in Table 4.

In the visual observation that was also made after the fixation process to check whether the produced color was in agreement with the desired color without appearance failure, color unevenness, and color missing portions, no particular deficiencies were found.

TABLE 4

|  | Y | L* | a* | b* |
|---|---|---|---|---|
| Single-sided dyeing | 47.21 | 74.32 | −10.39 | 35.76 |

As seen in Table 4, by dyeing only the single surface of the lens 22, the lens 22 could merely be dyed in the color density of about 50% in one dyeing work.

EXAMPLE 3

The dyeing operation in this example uses a lens 22 made of a thioepoxy type material with a high refractive index (1.74) and a disperse dye (water-base) made by Upepo Kabushiki Kaisha as a sublimatable ink. With use of a drawing software in the PC 1, the hue (U) is set to 120, the saturation (S) is set to 170, and the lightness (V) is set to 150. Based on this color data, two circular layers 12 each having a diameter of 90 mm are printed on a print sheet 11 having a white front face (printing face) and a black back face. Sequentially, the sheet 11 is cut to remove the needless margin so as to fit into the dyeing jig 30 shown in FIG. 4. The base body 10 is thus produced.

Next, in the same manner as in the example 1, the vapor-deposition device 20 and the jig 30 are used to execute the dyeing operation on the lens 22. This dyeing operation is performed on only the concave surface of the lens 22, not both surfaces. The pressure in the device 20 is reduced to 1 kPa. Only the upper lamps 21 are lit up to continuously heat the base body 10 until its temperature rises to 250° C. After the completion of heating, the dyed lens 22 is taken out and subjected again to the same process to sublimate and vapor-deposit the dye twice onto the concave surface of the lens 22. Then, the lens 22 is heated in the oven 3 under different heating conditions to fix the color of the dyed lens 22. The heating conditions of the oven 3 are set to four types: 1 hour at a temperature of 125° C.; 1 hour at 135° C.; 2 hours at 135° C.; and 2 hours at 150° C.

The dyeing results of the lens 22 after the fixation process is shown in Table 5. The color measurement is made using a spectroscopic photometer as in the case of the example 2.

In Table 5, Y indicates visual sensitivity transmittance; and L*, a*, and b* indicate CIE color specification values.

In the visual observation that was made after the fixation process to check whether the produced color was in agreement with the desired color without appearance failure, color unevenness, and color missing portions, no particular deficiencies were found.

TABLE 5

| Coloring conditions | Y | L* | a* | b* |
| --- | --- | --- | --- | --- |
| 125° C. - 1 Hr | 72.79 | 88.35 | −7.51 | 5.27 |
| 135° C. - 1 Hr | 57.95 | 80.71 | −15.43 | 7.46 |
| 135° C. - 2 Hr | 56.99 | 80.18 | −13.92 | 5.68 |
| 150° C. - 2 Hr | 41.14 | 70.28 | −23.49 | 8.73 |

As seen in Table 5, even the material with high refractive index which has been considered as having low (poor) dyeability could be dyed in high color density without any deficiency by the dyeing method of the present invention.

In another dyeing operation, a lens 22 itself is dipped in a 0.2% carrier solution (DK-C of Daiwa Kagaku Kogyo Kabushiki Kaisha) for pretreatment at a temperature of 80° C. for about 2 min. Then, the dyeing operation is executed under the above conditions (the coloring conditions in Table 5).

As a result, the same visual sensitivity transmittance as in the case of the above conditions could be obtained in half of the heating time (duration) in all the conditions.

Comparison 3

The same lens 22 as in the example 3 is dyed by the dip dyeing method. A dyeing solution containing disperse dyes of red: 1 g/l, yellow: 1 g/l, and blue: 4 g/l is prepared. The dyeing solution is heated to about 90° C. The lens 22 is dipped into the heated solution for 30 min. Sequentially, the dyed lens 22 is heated in the oven 3 for 1 hour at a temperature of 115° C., then completing the dyeing operation. A dyeing result is shown in Table 6.

TABLE 6

| Coloring condition | Y | L* | a* | b* |
| --- | --- | --- | --- | --- |
| 115° C. - 1 Hr | 85.04 | 93.90 | −0.79 | 0.87 |

As shown in Table 6, the dyeing for 30 min. could produce only the color of about 15% density. In addition, the dipping time (duration) and the heating time (duration) in the oven 3 were extended, but no change was found in the result.

As described above, according to the present invention, the plastic lens can be easily and efficiently dyed. Furthermore, various lenses can be stably dyed in various colors.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto.

What is claimed is:

1. A dyeing method of dyeing a plastic lens, including:
   a step of placing the lens in a vacuum vapor-deposition device;
   a step of placing two base bodies to be used for a dyeing operation in the vapor-deposition device, each base body being applied with a dyeing solution containing a dissolved or fine-grained dispersed sublimatable dye to form a dye application area on each base body, and the base bodies being arranged in opposite positions to each other with respect to the lens so that the dye application area faces each surface of the lens without contact therewith; and
   a step of heating the base bodies by heat sources under vacuum in the vapor-deposition device, thereby sublimating the dye of the dye application areas to vapor-deposit the sublimated dye on the lens.

2. The dyeing method according to claim 1, wherein the placing step includes placing a first base body on the convex surface side of the lens and a second base body on the concave surface side of the lens.

3. The dyeing method according to claim 2, wherein the placing step includes placing the first base body in a position at a distance of 1 to 30 mm from a geometrical center of the convex surface of the lens and the second base body in a position at a distance of 1 to 30 mm from a geometrical center of the concave surface of the lens.

4. The dyeing method according to claim 1, wherein the heating for vapor-deposition step includes heating the base bodies arranged on both sides of the lens respectively by the heat sources each disposed in a position opposite to the lens with respect to the base body and without contact with the base body.

5. The dyeing method according to claim 4, wherein the heating for vapor-deposition step includes heating the base bodies by the heat sources each disposed in the position at a distance of 50 to 500 mm from the base body.

6. The dyeing method according to claim 1 further including a step of heating the lens on which the dye has been vapor-deposited, thereby fixing the dye on the lens.

7. The dyeing method according to claim 1 further including a step of producing the base bodies by applying the dyeing solution on each base body.

8. The dyeing method according to claim 7 further including a step of inputting information on dyeing color and density to a computer which stores and controls color data,
   wherein the producing step includes: controlling a printer connected to the computer and supplied with a plurality of the dyeing solutions; and producing the base bodies by printing the dyeing solution on each base body based on the color data stored and controlled in the computer and the information on the dyeing color and density input into the computer.

* * * * *